Patented Jan. 9, 1951

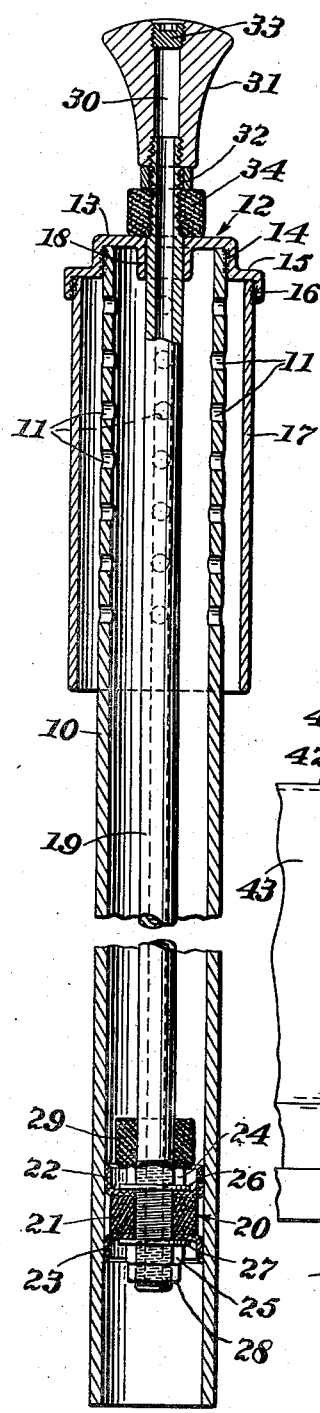

2,537,215

UNITED STATES PATENT OFFICE 2,537,215

RADIATOR FLUSHING DEVICE

William J. Dunn, Lake Charles, La.

Application May 31, 1946, Serial No. 673,655

9 Claims. (Cl. 134—169)

This invention relates to means for flushing parts such as the radiators of automobiles and the like.

A principal object of the invention is to provide means whereby a part such as a radiator can be thoroughly cleaned in a short time and, in the case of an automobile radiator, without removing the radiator from the car. In accordance with the invention, powerful alternating pressure and suction actions are applied at one of the radiator ports or openings while a flushing liquid is flowed into another opening, and between series of said actions, free flow out of said one opening is permitted, the outflow carrying with it the loosened accretions and being observable as to condition. Outflow through the other opening caused by the pressure action is manually controllable.

Apparatus in accordance with the invention is shown in the accompanying drawing in which:

Figure 1 is an axial section of a flushing tool,

Figure 2 is a view like that of Figure 1 showing the parts in a different relation, Figure 3 is a section on line 3—3 of Figure 2, Figure 4 is an elevation showing the tool in operative association with a radiator, and Figure 5 is a partial axial section showing a modification.

Referring to Figures 1 to 4, reference numeral 10 designates an elongated cylinder provided, adjacent one end, with numerous relatively small perforations 11. Reference numeral 12 designates a cap having a top 13 and a circular depending skirt portion 14 which embraces the perforated end of the cylinder 10, and the parts are sweated together. An annular flange 15 projects outwardly of the skirt portion 14 and a second circular skirt portion 16, coaxial with the first, depends from the outer edge of the flange and has sweated therein one end of a tube 17 which covers the perforate portion of the cylinder in concentric spaced relation thereto. The cap has an axial bore inwardly rimmed by a collar portion 18.

Slidable in the cap bore and collar is a tubular piston rod 19 to the threaded inner end of which is secured a piston 20 which includes a cylindrical body 21 against which are clamped oppositely faced leathers 22 and 23 by means of nuts 24 and 25 and washers 26 and 27, reference numeral 28 designating a lock nut. A rubber bumper block 29 surrounds the piston rod and rests on nut 24. The other end of the piston rod is threaded and engaged in the threaded extremity of an axial bore 30 of a knob 31 and is locked by a nut 32. As here shown, the outer end of bore 30 is sealed by a threaded plug 33. A rubber bumper block 34 surrounds the piston rod between nut 32 and the cap 12.

In Figure 4 the radiator 35 includes top and bottom tanks 36 and 37. Tank 36 has a top filling neck 38 and a rearwardly projecting flow fitting 39 connected through a hose section 40 with a flow fitting 41 projecting from the thermostat cover 42 which is fixed to the engine block 43 in the usual manner. The bottom tank 37 has an upwardly bent flow fitting 44 normally connected by a piece of tubing 45 with a water pump 46.

In the use of the tool, the hose 45 is disconnected from the water pump and is slipped over the open end of the cylinder 10, or, if necessary, any suitable adapter may be used. Water is continuously flowed into the radiator from a hose 47 inserted in the filling neck. As here shown, the hose is received in the filling neck with considerable clearness and a rag or cloth 48 is wrapped about the top of the filling neck and can be grasped by the hand of the operator to more or less close off the space between the hose and the filling neck. The operator, grasping knob 31, reciprocates the piston 20 through a range below the perforations 11 and since due to the provision of the two leathers the piston is effective in both directions, i. e., two-way acting, alternating powerful suction and pressure actions are applied at the lower opening or port, the operator suitably loosening his hold on the cloth 48 during the pressure stroke to permit controlled escape of the flushing fluid around hose 47. After several reciprocations of the piston it is pulled up to the top of the cylinder as in Figure 2 so that some of the perforations are uncovered and permit substantially free outward flow of the flushing liquid which is deflected downwardly by the tube 17. The piston is then again reciprocated in the imperforate portion of the cylinder, again pulled to the top, and so on, until the outflow appears clear.

With the piston at the top of its travel bumper 29 engages collar 18. Some of the top perforations are above the piston when it is in this upper limit and, consequently, fluid above the piston can flow outwardly, thus eliminating dash-pot effect and making it unnecessary to provide a seal between the piston rod and cap. This is an important feature from the standpoints of easy operation and simplicity in construction.

If after several of the described operations the water does not flow clear and freely from the top of the tool, a cleaning compound should be used.

In that case, the radiator hose 45 is re-connected with the pump and the radiator is refilled with water. The motor is then run until the water in the radiator becomes hot. A suitable quantity of radiator cleaner is then poured into the radiator and the motor is run for about 30 minutes. The tool is then reinstalled and the flushing procedure repeated. The hose is then re-connected to the pump, the radiator refilled with water and added neutralizer, and the motor is run for ten or fifteen minutes. The tool is re-applied and the flushing operation repeated. At this point the thermostat is removed, the cover replaced, and the flushing action is repeated holding the cloth tightly about hose 47 and the filler neck. This causes back pressure of the water through the motor block jacket, washing out the latter. Flushing is continued until the outflow shows the block is thoroughly clean.

In case it is desired to inject air into the radiator for additional agitating effect, plug 33 is removed and an air hose coupling of any suitable kind substituted. Manipulation can proceed as previously described with air being simultaneously injected.

In Figure 5 the cap 12a is like the cap 12 except that its skirt portions are internally threaded for engagement by the threaded ends of cylinder 10a and tube 17a. This enables the tube to be easily removed in case it should be necessary to clean the perforations 11.

Numerous small perforations rather than fewer large ones are provided so as to avoid injury to the leathers in passing thereover. The tubular portion 17 preferably extends only sufficiently beyond the perforated zone to intercept all of the issuing streams. Thus the tool is of relatively small diameter throughout most of its length which is of considerable advantage in view of the close quarters in which it is used. Furthermore the outflow is more easily observable. The tubular portion also guards the perforations against clogging when the tool is not in use and also provides a convenient hand hold. While the tube may vary in proportions, the inner cylinder may conveniently be, for example, about 18 inches long with an inner diameter of 1⅛" and an outer diameter of 1⅜".

Variations in procedure and in the form and arrangement of parts beyond those shown are contemplated under the invention as defined in the following claims.

I claim:

1. A flushing tool comprising an elongated cylinder for connection at one end with a port of a part to be flushed, a cap closing the other end of the cylinder, a two-way acting piston in said cylinder, a piston rod secured to said piston and projecting slidably through an aperture in said cap, perforations in said cylinder adjacent said other end thereof uncovered by the piston when the piston moves to the limit of its travel toward said cap, the cylinder having an imperforate length adjacent said one end in which the piston is reciprocable, a tube surrounding the perforate portion of the cylinder in spaced relation thereto, and means at said other end of the cylinder closing the space between the cylinder and tube and rigidly supporting the tube from the cylinder.

2. A flushing tool comprising an elongated cylinder for connection at one end with a port of a part to be flushed, a cap closing the other end of the cylinder, a two-way acting piston in said cylinder, a piston rod secured to said piston and projecting slidably through an aperture in said cap, perforations in said cylinder adjacent said other end thereof, some of said perforations being uncovered by the piston when the piston moves to the limit of its travel toward said cap and others of said perforations being between the piston and the cap when the piston is at said limit of travel, the cylinder having an imperforate length adjacent said one end in which the piston is reciprocable, a tube surrounding the perforate portion of the cylinder in spaced relation thereto, and means at said other end of the cylinder closing the space between the cylinder and tube and rigidly supporting the tube from the cylinder.

3. A flushing tool comprising an elongated cylinder for connection at one end with a port of a part to be flushed, a cap closing the other end of the cylinder, a two-way acting piston in said cylinder, a piston rod secured to said piston and projecting slidably through an aperture in said cap, means yieldingly limiting the movement of said piston toward said cap, perforations in said cylinder adjacent said other end thereof, some of said perforations being uncovered by the piston when the piston moves to its limit toward said cap and others of said perforations being between the piston and the cap when the piston is in said limit position, the cylinder having an imperforate length adjacent said one end in which the piston is reciprocable, a tube surrounding the perforate portion of the cylinder in spaced relation thereto, and means at said other end of the cylinder closing the space between the cylinder and tube and rigidly supporting the tube from the cylinder.

4. A flushing tool comprising an elongated cylinder for connection at one end with a port of a part to be flushed, a cap closing the other end of said cylinder, a piston in said cylinder, said piston including oppositely faced leathers, a piston rod secured to said piston and projecting slidably through an aperture in said cap, perforations in said cylinder adjacent said other end thereof uncovered by the piston when the piston moves to the limit of its travel toward said cap, the cylinder having an imperforate length adjacent said one end in which the piston is reciprocable, a tube surrounding the perforate portion of the cylinder in spaced relation thereto, and means at said other end of the cylinder closing the space between the cylinder and tube and rigidly supporting the tube from the cylinder.

5. A flushing tool comprising an elongated cylinder for connection at one end with a port of a part to be flushed, a cap closing the other end of the cylinder, a two-way acting piston in said cylinder, a piston rod secured to said piston and projecting slidably through an aperture in said cap, perforations in said cylinder adjacent said other end thereof uncovered by the piston when the piston moves to the limit of its travel toward said cap, the cylinder having an imperforate length adjacent said one end in which the piston is reciprocable, said cap having an imperforate peripheral flange, and a tube surrounding the perforated portion of the cylinder in spaced relation thereto and rigidly secured to said flange.

6. A flushing tool comprising an elongated cylinder for connection at one end with a port of a part to be flushed, a cap closing the other end of the cylinder and including a cylindrical skirt portion embracing said other cylinder end and secured thereto, a two-way acting piston in said cylinder, a piston rod secured to said piston and projecting slidably through an aperture in said cap, perforations in said cylinder adjacent said other end thereof uncovered by the piston when the piston moves to the limit of its travel toward said cap, said cylinder having an imperforate length adjacent said one end in which the piston is reciprocable, said cap including an imperforate peripheral flange and a second cylindrical skirt portion of larger diameter than the first projecting from said flange in coaxial relation with the first, and a tube surrounding the perforate portion of the cylinder in spaced relation thereto with one end embraced by and secured in said second skirt portion.

7. Structure according to claim 6 wherein the cylinder and tube are sweated in said skirt portions.

8. Structure according to claim 6 wherein the tube is threaded in said second skirt portion.

9. A flushing tool comprising an elongated cylinder for connection at one end with a port of a part to be flushed, a cap closing the other end of the cylinder, a two-way acting piston in said cylinder, a piston rod secured to said piston and projecting slidably through an aperture in said cap, a multiplicity of small perforations in said cylinder adjacent said other end thereof some of which are uncovered by the piston when the piston moves to the limit of its travel toward said cap and others of which are between the piston and cap when the piston is in said limit position, an imperforate length adjacent said one end in which the piston is reciprocable, a tube surrounding the perforate portion only of the cylinder in spaced relation thereto, and means at said other end of the cylinder closing the space between the cylinder and tube and rigidly supporting the tube from the cylinder.

WILLIAM J. DUNN.

REFERENCES CITED

The following references are of record in the file of this patent:

UNITED STATES PATENTS

| Number | Name | Date |
| --- | --- | --- |
| 909,276 | Bingham | Jan. 12, 1909 |
| 1,623,363 | Schwanke | Apr. 5, 1927 |
| 2,009,433 | Carroll | July 30, 1935 |
| 2,175,652 | Trier | Oct. 10, 1939 |
| 2,311,196 | Ahern | Feb. 16, 1943 |
| 2,353,871 | Bowen | July 18, 1944 |
| 2,388,836 | Dunn | Nov. 13, 1945 |
| 2,437,456 | Bodine | Mar. 9, 1948 |